3,226,418
PREPARATION OF TRIFLUOROMETHYL FLUOROFORMATE AND BISTRIFLUOROMETHYL CARBONATE
Burton Carl Anderson, Graylyn Crest, Wilmington, and Gerhard Robert Morlock, Silver Springs, Wilmington, Del., assignors to E. I. du Pont de Nemours and Company, Wilmington, Del., a corporation of Delaware
No Drawing. Filed Dec. 1, 1961, Ser. No. 156,520
1 Claim. (Cl. 260—463)

This invention relates to the formation of carbonyl fluoride dimer and trimer, trifluoromethyl fluoroformate and bistrifluoromethyl carbonate.

Carbonyl fluoride has been demonstrated to be a useful intermediate in organic syntheses. By means of a reductive dimerization, such as described in U.S. Patent 2,709,189, it may be converted to tetrafluoroethylene from which in turn may be prepared highly thermally and chemically resistant polymers. The methods of preparation of carbonyl fluoride recognized by the art normally employ carbonyl chloride (phosgene) as the starting material. The product from such processes may be contaminated with hydrogen chloride and carbon dioxide, impurities which not only are difficult to remove because of the closeness of their boiling points to that of the product, but which are highly undesirable if a 100% pure product is required for use in subsequent reactions. High purity frequently is achieved by means of procedures employing chemical reactants for removal of the impurities, such as described in U.S. Patent 2,836,622, procedures which, however are difficult to carry out without loss of carbonyl fluoride.

An object of the present invention is to provide a useful means of preparing pure carbonyl fluoride. A further object is to provide such pure carbonyl fluoride through use of intermediate precursors which are new compositions of matter. A still further object is to provide a method by which the pure carbonyl fluoride precursors can be synthesized. Other objects will become apparent hereinafter.

The objects of the present invention are achieved through the synthesis and utilization of the dimer and trimer of carbonyl fluoride, trifluoromethyl fluoroformate and bistrifluoromethyl carbonate. The dimer and/or trimer, after removal of impurities, are converted to pure monomer via basic catalysis. The dimer and trimer are synthesized from carbonyl fluoride by means of a base-catalyzed reaction conducted at −50 to −110° C. In such a reaction there is realized a 45–60% conversion to dimer and a lower conversion to trimer, usually in the order of about 1%. Although temperatures higher than −50 to −110° C. may be used, they are not preferred since the conversion is reduced because of the unfavorable equilibrium which exists between starting material and products at these temperatures and, also, frequently because of loss of activity of the catalyst. At temperatures below this range, reaction rates are too low for efficient operation. Autogenous operating pressures are adequate although, as expected, the dimerization is favored by superatmospheric pressures. Pressures of 5000 atmospheres frequently are used, but to achieve an optimum balance between reaction rate and process feasibility, pressures of 1–10 atmospheres are preferred. The reaction, further may be carried out either in the presence or absence of a non-reactive solvent. Examples of solvents which are preferred include hydrocarbon solvents such as propane, petroleum ether and toluene. Polar solvents which may participate in the reaction, for example, nitroethane, diethyl ether and alkyl ethers of ethylene glycol and diethylene glycol, are less satisfactory. A wide variety of conventional anionic catalysts may be used for the dimerization reaction. Although their activities may vary, such agents as amines, substituted amines, quaternary ammonium compounds, amides, metal fluorides, alkali metal alkoxides, alkali metal organometallics, metal salts of acids having a pK of 3–10 which when contacted with the monomeric carbonyl fluoride will yield a metal fluoride, and basic carbon blacks are effective in the conversion of carbonyl fluoride to trifluoromethyl fluoroformate and bistrifluoromethyl carbonate. Examples of the above include dimethyl formamide, N-methylformanilide, trimethylamine, piperidine, betaine (trimethylbetaine of glycine), potassium phthalimide, sodium methoxide, n-butyl lithium, sodium benzoate, lead acetate, potassium acetate, cesium fluoride and "Darco" 12 x 20, activated carbon prepared from lignite and having about 25 weight percent ash content. Especially desirable as a catalyst is an alkali metal salt of an acid having a pK of 3–10. In demonstrating the variation in rate which may be realized with the above catalysts it may be shown that, exempli gratia, using n-butyl lithium as catalyst equilibration is achieved in about two hours, with potassium phthalimide, in about four hours and with "Darco" 12 x 20, in about one day. Only small amounts of catalyst are required, although with the less active catalysts larger quantities are desirable to take advantage of the increased rates obtainable with increasing catalyst concentrations. In keeping therewith the catalyst concentration is maintained between 0.01 and 20 weight percent of the monomer. The optimum reactivity with the preferred catalysts is achieved with 0.1–10 weight percent. The reaction time, as indicated above, will vary with the catalyst, catalyst concentration and pressure. For optimum process feasibility they are selected to provide a reaction time of 1–24 hours and preferably 1–10 hours. Since the products formed are in equilibrium with the starting material, the catalyst must be removed before the temperature is raised or the products are isolated. The activated carbons, although less active than some of the other catalysts, lend themselves to ready removal via filtration. After separation of the catalyst from the reaction mixture the products may be recovered by distillation at atmospheric pressure through a low temperature column packed with stainless steel helices. Carbon dioxide, hydrogen chloride and carbonyl fluoride are removed at −85 to −78° C. while trifluoromethyl fluoroformate is collected at −35 to −33° C. and bistrifluoromethyl carbonate, at from −10° C. to 10° C. The infrared absorption spectrum of the dimer exhibits a carbonyl peak at 5.25 microns, a shift from the 5.15 micron carbonyl peak of the monomer. Further, the 10.2 micron peak typical of carbonyl fluoride is absent in the dimer. Other peaks characteristic of the dimer appear at 7.93, 8.50, 9.80 and 11.2 microns. The 7.93 and 9.80 micron bands are attributed to carbon-fluorine stretching vibrations and the 8.50 and 11.2 micron bands, to carbon-oxygen-carbon stretching. A nuclear magnetic resonance spectrum of the trifluoromethyl fluoroformate displays a quartet structure assignable to the —COF group influenced by the —CF$_3$ group and a doublet assignable to the fluorine atoms of the latter group influenced by the former. Bistrifluoromethyl carbonate exhibits an infrared absorption spectrum in which the carbonyl peak appears at 5.36 microns. The 10.2 micron peak typical of the monomer is absent while other peaks characteristic of the trimer appear at 7.73, 7.92, 8.77 and 8.95 microns. A nuclear magnetic resonance spectrum of the trimer exhibits a singlet assignable to the fluorine atoms of the —CF$_3$ group. The dimer and trimer, either individually or as a mixture, are converted to carbonyl fluoride with catalytic amounts of anionic catalysts at temperatures as low as —80° C. The compounds are stable up to five hours at 140° C. in the absence of base or in acidic media. Usually, the conversion to monomer is carried out at —50 to 100° C. with 0.01–20 weight percent of the anionic catalyst as hereinabove described, and preferably at 0 to 100° C. with 0.1–10 weight percent catalyst. The pure monomer, B.P. —85 to —83° C., is condensed in a suitable cold trap for subsequent use.

The dimer and trimer of carbonyl fluoride, likewise, may be synthesized from monomer by an alternate, apparently mechanistically unrelated process, namely a photoinitiated reaction employing ultraviolet light. Particularly useful is ultraviolet light having a wavelength in the range 1700–2000 Angstrom units. Although not limited thereto, especially practical as a source of ultraviolet light is a quartz mercury resonance lamp emitting light having a wavelength of 1849 Angstrom units. The following examples, including both preparative processes, are given to illustrate but not limit the usefulness of the invention.

*Example I*

Into an appropriately modified, 200 cc., Dry Ice, acetone-cooled, nitrogen-flushed, round bottom flask containing 5 grams of "Darco" 12 x 20 activated carbon is condensed 100 grams of impure carbonyl fluoride prepared from phosgene and hydrogen fluoride using a conventional preparative method. After four days at —80° C. the flask is inverted and its contents filtered through a sintered glass frit previously connected to the top of said flask. The filtrate is collected in a second round bottom flask cooled in Dry Ice, acetone. The filtrate is distilled twice through a low temperature column packed with stainless steel helices to yield 45 grams of pure trifluoromethyl fluoroformate having a boiling point of —35 to —33° C. and about 1 gram of bistrifluoromethyl carbonate boiling between —10 and 10° C. at atmospheric pressure. The purity of the product is established by means of infrared and nuclear magnetic resonance analyses as described supra.

*Example II*

Example I is repeated using a variety of catalysts and conditions as disclosed in the following table. In all cases yields comparable to that in Example I are obtained.

| Catalyst | Solvent | Temperature (° C.) | Pressure (Atm.) | Reaction time, hours |
|---|---|---|---|---|
| Dimethylformamide | None | —50 | 5,000 | 6 |
| Trimethylamine | do | —50 | 5,000 | 6 |
| Cesium fluoride | do | —50 | 5,000 | 6 |
| Betaine | Toluene | —80 | Autogenous | 4 |
| Potassium acetate | do | —80 | do | 4 |
| Lead acetate | None | —80 | do | 4 |
| Potassium phthalimide | Propane | —80 | do | 4 |
| n-butyl lithium | None | —80 | do | 2 |

*Example III*

An evacuated, flamed-out, 22 liter, round bottom flask is charged with gaseous carbonyl fluoride until the flask pressure reaches one atmosphere. After being sealed the flask is irradiated using a new, quartz, mercury-resonance lamp for 62 hours, during which time there is a pressure drop within the flask of 12 cm. The products are transferred to a low temperature distillation apparatus and separated as in Example I. The purity of the trifluoromethyl fluoroformate and bistrifluoromethyl carbonate is established, in addition to the methods described above, by a gas chromatographic analysis. Elemental analyses on the trimer show the following: carbon, 19.23; fluorine, 57.57; calculated: carbon 18.20; fluorine, 57.58.

In addition to their usage as a means of obtaining pure carbonyl fluoride either the dimer or the trimer is useful as a refrigerant, aerosol propelent or gaseous dielectric. For example, the dimer or trimer or a mixture of the two, along with a solution to be dispensed, are transferred to a pressure-type container having a finger release valve (commonly known as an aerosol container). After being sealed the contents are discharged as a fine mist through the exit valve when the latter is held open.

We claim:

The process of preparing a compound selected from the group consisting of trifluoromethyl fluoroformate and bistrifluoromethyl carbonate, said process comprising contacting carbonyl fluoride with 0.01–20 weight percent anionic catalyst selected from the group consisting of dimethyl formamide, N-methylformanilide, trimethylamine, piperidine, betaine, potassium phthalimide, sodium methoxide, n-butyl lithium, sodium benzoate, lead acetate, potassium acetate, cesium fluoride, and activated carbon at —50 to —110° C. and from 1 to 5000 atmospheres pressure, removing said catalysts and isolating the product from the remaining mixture.

References Cited by the Examiner

UNITED STATES PATENTS

| | | | |
|---|---|---|---|
| 636,384 | 11/1899 | Hofmann | 260—463 |
| 2,661,331 | 12/1953 | Howard | 204—158 |
| 2,662,854 | 12/1953 | Miescher et al. | 204—158 |
| 2,806,061 | 9/1957 | Wygant | 260—544 |
| 2,820,810 | 1/1958 | Frevel et al. | 260—463 |
| 2,937,161 | 5/1960 | Ellingboe | 260—78 |
| 3,020,313 | 2/1962 | Aulbaugh et al. | 260—544 |
| 3,047,610 | 7/1962 | Brace et al. | 260—463 |

CHARLES B. PARKER, *Primary Examiner.*